Oct. 16, 1951     W. G. DAGUE     2,571,841
ANIMAL TRAP
Filed July 8, 1947     2 SHEETS—SHEET 1
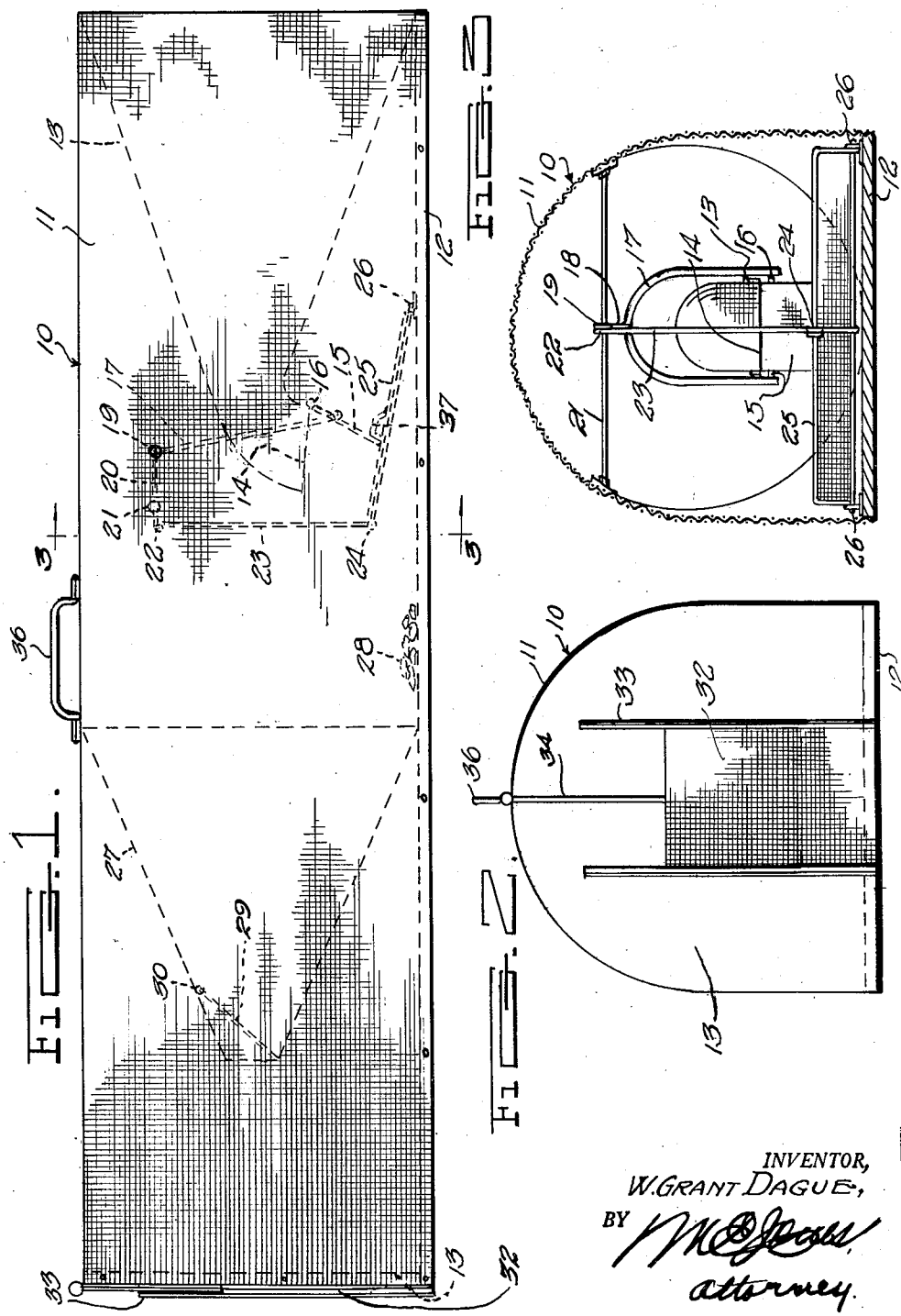
INVENTOR,
W. GRANT DAGUE,
BY 
attorney.

Oct. 16, 1951 W. G. DAGUE 2,571,841
ANIMAL TRAP
Filed July 8, 1947 2 SHEETS—SHEET 2
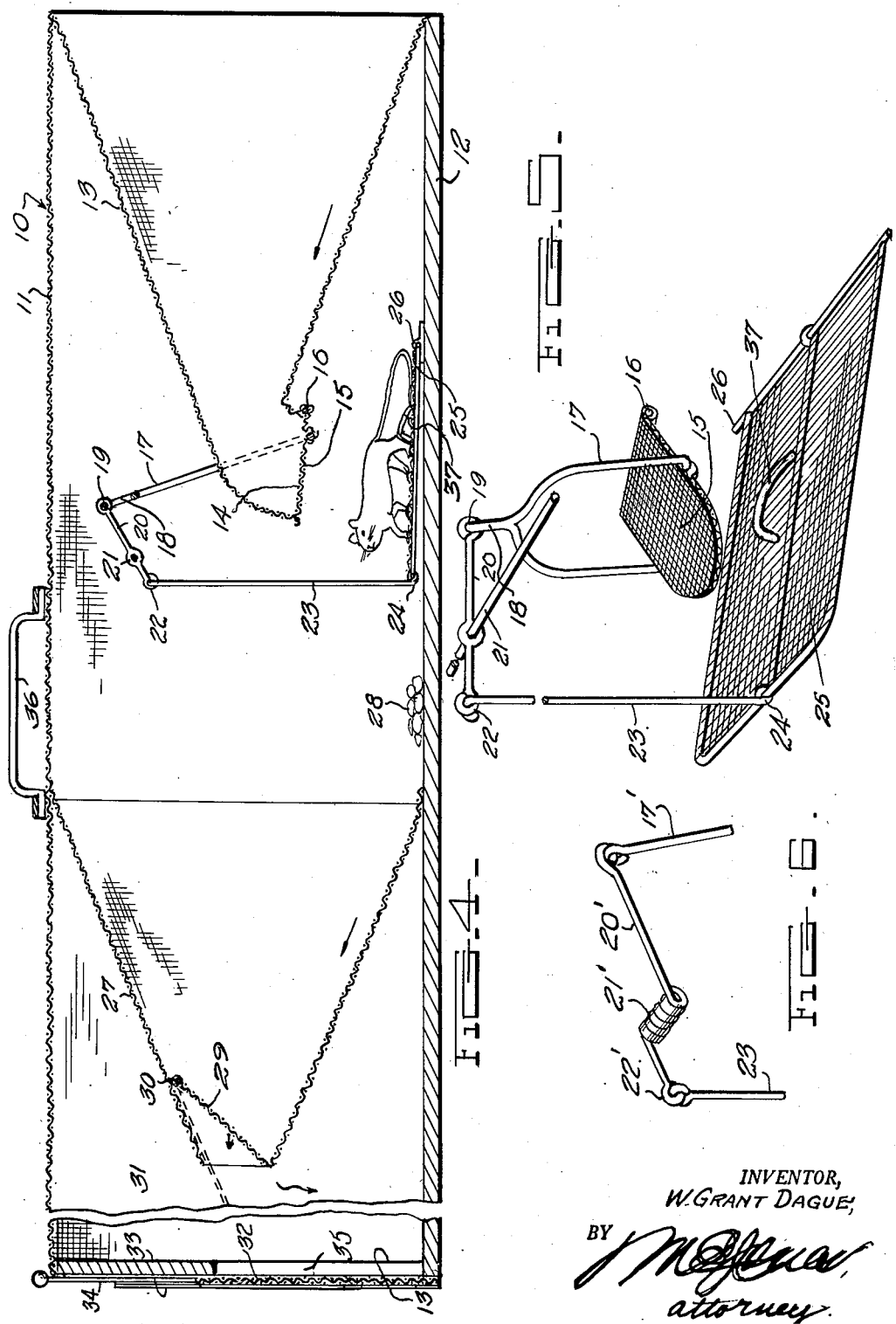
INVENTOR,
W. GRANT DAGUE,

Patented Oct. 16, 1951

2,571,841

UNITED STATES PATENT OFFICE 2,571,841

ANIMAL TRAP

William Grant Dague, Claysville, Pa.

Application July 8, 1947, Serial No. 759,659

3 Claims. (Cl. 43—67)

This invention relates to a trap designed primarily to catch small animals alive, such as rodents, and especially rats, although no limitation as to such use is to be implied.

It is particularly aimed to provide a construction having a normally open entrance which will be closed only through the weight of a trapped animal when adjacent said entrance.

Another object is to provide a trap having an entrance controlled by a closure balanced in open position and operable to close under the weight of a trapped animal.

A further object is to provide a trap in the general form of a cage employing a novel combination of successive generally conical tunnels therein arranged for entrance of an animal through their larger ends, with the smaller end of the first tunnel normally open and having associated means operable by a trapped animal adjacent the same to close it, and with the smaller end of the other tunnel forming the direct entrance to the captive chamber closed, except when opened through actual contact therewith when an animal enters the captive chamber.

The same specific objects and advantages will become apparent from a consideration of the description following, taken in connection with the accompanying drawings illustrating an operative embodiment by way of example.

In said drawings:

Fig. 1 is a view in elevation of the improved trap;

Fig. 2 is a rear end elevation;

Fig. 3 is a transverse sectional view taken on the line 3—3 of Fig. 1;

Fig. 4 is an enlarged vertical longitudinal sectional view through the trap, parts being broken away;

Fig. 5 is a fragmentary perspective view of the closure actuating means for the entrance tunnel; and Fig. 6 is a fragmentary perspective view of a modified form of entrance closure actuating means.

Referring specifically to the drawings wherein like reference characters designate like or similar parts throughout the different views, the trap is generally in the form of an elongated cage 10, which is generally open so that the light will enter so as to thwart an animal to a minimum. This cage is primarily made of metallic netting or other reticulated openwork material, for instance metallic hardware cloth or screening forming an inverted U-shaped wall 11 which is secured to a base of wood or other suitable material as at 12, the right hand end of the cage being open and the left hand end being closed by a wall 13, preferably of wood.

Extending longitudinally within the cage 10 is a tubular tunnel 13' which is generally conical and having its larger end at the right hand end of the trap, and constituting the entrance for the animals. The smaller or inner end of the tunnel 13' is elevated with respect to the base 12 and is open at 14, such opening being in the under side of the tunnel and thus not in the direct line of the animal's vision. A closure plate 15 is provided for the opening 14. This closure plate 15 is pivotally mounted in any suitable way as by means of a hinge rod 16 carried by the tunnel 13'. To opposite ends of the hinge rod 16, a U-shaped link 17 is secured which has an extension 18 pivotally secured at 19 to a longitudinally extending lever 20, which is fulcrumed on a transverse rod 21 having its ends secured in any suitable manner to opposite sides of the wall 11.

Pivotally secured to the lever 20 in the rear of the rod 21, as at 22, is an upright link 23 which is pivoted at 24 to the rear end of a platform 25 which extends approximately the full width of the base 12, and which at its forward end is hinged or pivoted at 26 to such base.

The closure plate 15 is normally open and seeks such normally open position in order to lure the animal into the trap, and it is maintained in and urged to such open position due to the fact that the various parts, such as link 17, lever 20, link 23 and platform 25 are balanced when the closure plate 15 is open as shown in Fig. 1. If desired, and as best shown in Fig. 1, plate 15 may rest against an abutment 37 rising from platform 25.

In lieu of link 17 and lever 20, I may use the structure of Fig. 6, which discloses a lever 20' having coils 21' for pivotal mounting on rod 21, which lever is pivoted at one end to link 23 and at the other end to a single strand link 17' rather than one of U-shape.

An animal will walk into the trap because the opening 14 is not closed; however, upon entering the opening 14 it will tread on the platform 25 and its weight will depress the latter, and through the link 23, lever 20 and link 17, will close the opening 14 as soon as the platform 25 is subject to the weight of the animal. Even after the animal is out of contact with the platform 25, and the plate 15 is in open position, should the animal attempt to run through the opening 14, it must tread on the platform 25 which will immediately close the opening 14 and maintain it closed as long as such platform is subject to the animal's weight.

A second tunnel, which is designated 27, is arranged within the cage any desired distance behind the tunnel 13' and closure 15 and operating mechanism therefor. Tunnel 27 is secured to the wall 11 and to the base 12, and both tunnels 13' and 27 are made of the same material as mentioned with respect to the wall 11, so that light will enter the trap as an aid in luring an animal into the same.

Bait is placed in the trap on the base 12 as suggested at 28. An animal which enters the trap through the opening 14 in its frenzy to escape will pass through the tunnel 27, raising a closure plate 29 thereof pivoted thereto at 30, and through the small end of the tunnel 27, entering the rear portion of the cage which constitutes a captive chamber at 31, and which is of any desired size or extent in order to accommodate a multiplicity of animals. The plate 29 normally is closed due to gravity, and it will only be open while an animal is in contact therewith and entering the captive chamber 31. The trap will operate efficiently even in the absence of the tunnel 27, but in actual practice I have found that the efficiency is augmented by its employment.

Plates 15 and 29 and platform 25 may be made of the same material as cage 10 or of any other material desired.

It will be understood that the animals may be removed from the captive chamber 31 in any suitable manner. By way of example, I have shown a slidable closure at 32, which may be made of the same material as wall 11 and tunnels 13 and 27 in order that the light will penetrate the same. This closure 32 is held in place and mounted for sliding movement by a frame 33 secured to the wall 13, and such closure 32 is adapted for raising and lowering through the manipulation of a handle or rod 34 in order to open or expose an exit opening 35 in such rear wall 13.

A handle may be provided, if desired, on the wall 11 as at 36.

It will be understood that in use, with bait located as at 28, an animal will be lured through the tunnel 13' and will enter the interior of the trap through the opening 14, through which it cannot return or escape due to the fact that its weight will close the opening 14 by means of plate 15 when such weight is imposed on the platform 25. The animal in its frenzy to escape will enter and pass through the tunnel 27 into the captive chamber 31, raising the plate 29 as it wedges beneath the same and passes through the smaller or open end of such tunnel 27 and enters the captive chamber. Particular attention is called to the fact that the trap is "ever set" and will catch successive animals, in view of the fact that the opening 14 will only be closed during the presence of an animal on the platform 25.

Various changes may be resorted to provided they fall within the spirit and scope of the invention.

What is claimed is:

1. A trap comprising a foraminous cage, a foraminous tunnel carried thereby forming the entrance thereto and having a discharge opening in its lower wall and elevated with respect to the bottom of the cage, leading to the interior of the cage, a closure for said opening, a platform beneath said opening and closure pivoted to the cage adjacent the base thereof, a lever pivoted to the cage, a generally U-shaped link pivoted to the lever and straddling the tunnel and pivoted to said closure, and linkage pivoted to the lever on the other side of its axis to the said link and also pivoted to the platform, said platform, lever, link and linkage balancing said closure in an open position whereby the closure will close said opening while said platform is subjected to the weight of a trapped animal.

2. A trap comprising a foraminous cage, a foraminous tunnel carried thereby forming the entrance thereto and having a discharge opening in its lower wall and elevated with respect to the bottom of the cage, leading to the interior of the cage, a closure for said opening, a platform beneath said opening and closure pivoted to the cage adjacent the base thereof, a rod mounted within the cage, a lever having coils pivoted on said rod and arms extending in opposite directions from said coils, a link pivoted to one of said arms and to said closure, and linkage pivoted to the other arm on the other side of the axis of said lever to the said link and also pivoted to the platform, said platform, lever, link and linkage balancing said closure in an open position whereby the closure will close said opening while said platform is subjected to the weight of a trapped animal.

3. A trap comprising a foraminous cage and an elongated foraminous tunnel extending into the cage and forming the entrance thereto and having a discharge opening in its lower wall elevated with respect to the bottom of the cage, a closure for said opening pivoted to the tunnel having its pivotal axis nearest the entrance end of the tunnel, a platform pivoted to the cage beneath and spaced from said opening and closure, a lever pivoted to the cage higher than said closure, a link depending from the lever, and pivoted to said closure, and linkage pivoted to the lever on the other side of its axis to the said link rearwardly of the tunnel and closure and also pivoted to the platform, said platform, lever link and linkage balancing said closure in an open position whereby the closure will close said opening while said platform is subjected to the weight of a trapped animal.

WILLIAM GRANT DAGUE.

REFERENCES CITED

The following references are of record in the file of this patent:

UNITED STATES PATENTS

| Number | Name | Date |
|---|---|---|
| 107,844 | Wood | Sept. 27, 1870 |
| 133,557 | Baddeley | Dec. 3, 1872 |
| 721,321 | Nesmith et al. | Feb. 24, 1903 |
| 891,666 | Brown | June 23, 1908 |
| 1,472,423 | Baker | Oct. 30, 1923 |
| 1,479,509 | Meyer | Jan. 1, 1924 |
| 1,726,493 | Kelley | Aug. 27, 1929 |